Figure 9:
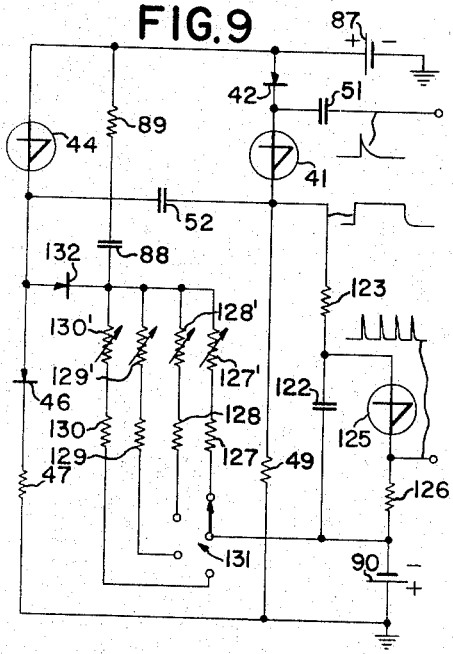

April 4, 1967 L. E. SCAGGS 3,312,832
HIGH SPEED NPNP AND MPNP MULTIVIBRATORS
Filed Oct. 25, 1961 4 Sheets-Sheet 1
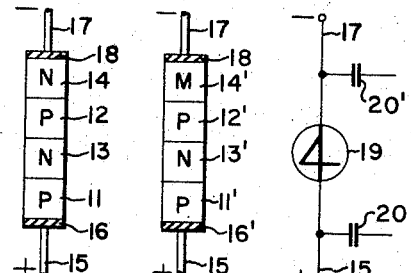
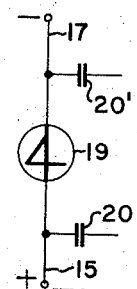
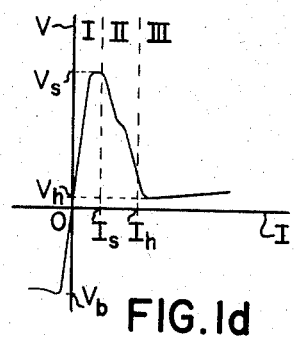
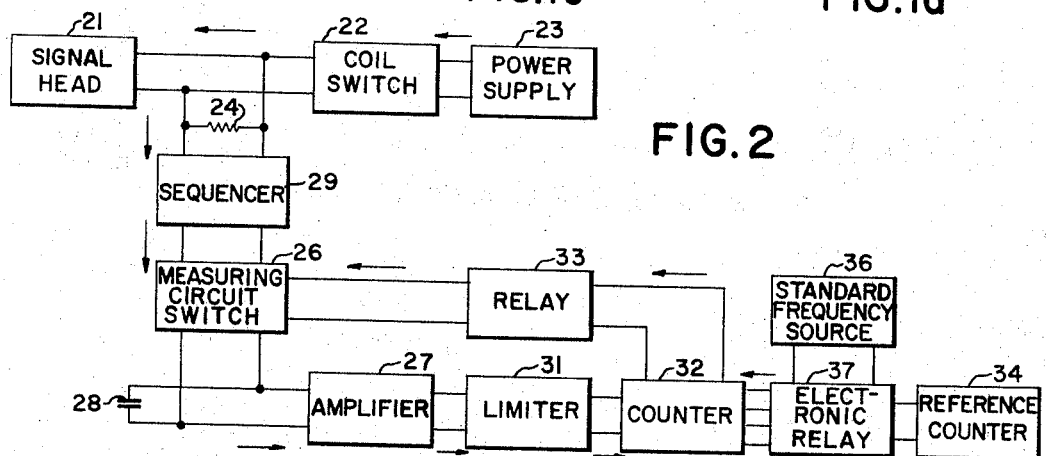
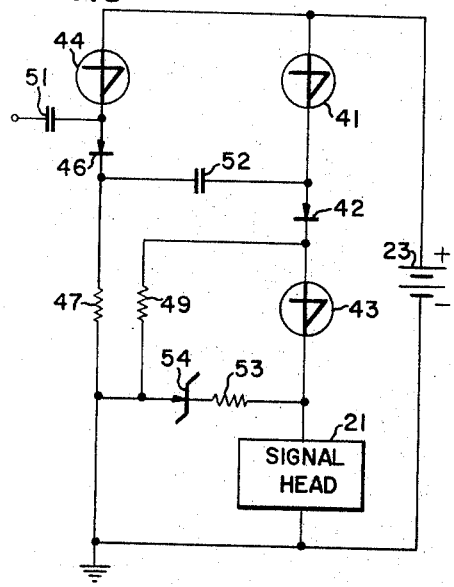
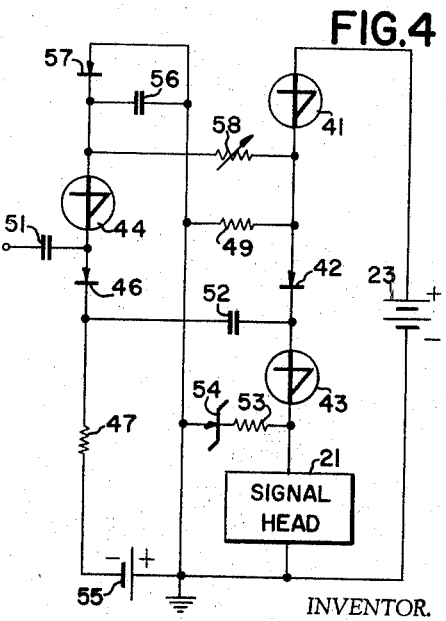
INVENTOR.
LEE E. SCAGGS
BY
*Harry E. Aine*
ATTORNEY

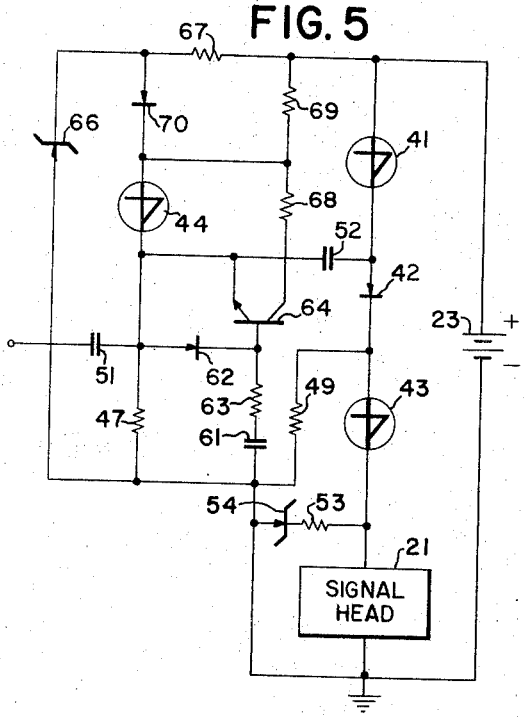

April 4, 1967   L. E. SCAGGS   3,312,832
HIGH SPEED NPNP AND MPNP MULTIVIBRATORS
Filed Oct. 25, 1961   4 Sheets-Sheet 3

INVENTOR.
LEE E. SCAGGS

BY *Harry E. Aine*

ATTORNEY

United States Patent Office 3,312,832
Patented Apr. 4, 1967

3,312,832
HIGH SPEED NPNP and MPNP MULTI-VIBRATORS
Lee E. Scaggs, San Jose, Calif., assignor to Varian Associates, Palo Alto, Calif., a corporation of California
Filed Oct. 25, 1961, Ser. No. 147,692
12 Claims. (Cl. 307—88.5)

This invention relates to electrical circuits and, more particularly, to switching circuits preferably employing solid state devices which switch currents on and off, rapidly and precisely.

One particular apparatus that would be improved by a circuit of the above characteristics is a magnetometer for measuring very weak magnetic fields, in the order of tenths of a gauss, to an accuracy of better than one part in a thousand operating in accordance with the principle of free precession of a magnetic moment as described in U.S. Patent No. 2,561,490. Briefly, such a magnetometer has a magnetic coil which forms a strong polarizing magnetic field through a sample (usually a hydrogenous fluid) characterized by particles (for example, protons) having characteristic magnetic and angular moments. The coil draws a current in the order of 2.5 to 3 amps which must be completely switched off so that the magnetic moments in the sample will precess at a frequency that is only dependent on the small residual unknown magnetic field to be measured. If so much as one microampere of leakage current remains in the magnetic coil this may distort the residual field and cause the instrument to malfunction. The same coil is preferably used to pick up a signal at the precession frequency induced by the precessing moments, the unknown magnetic field being determined by measuring the precession frequency. To make a rapid series of measurements, for example from a moving vehicle, the polarizing magnetic field must be formed and then removed, the precession frequency measured, and then the information stored. Preferably the information of the previous five or six magnetic field measurements should be stored in the magnetometer so that any appreciable rate of change of a magnetic field would be readily observed by the operator. Since the magnetometer measures magnetic field as a function of the number of cycles the sample precesses during a given time interval, the cycles are best counted in a binary counter that has a number of parallel circuits which are on-or-off in relation to the number of cycles counted. Binary circuits which are on-or-off are preferred for storing information since they are simple and compact. Heretofore the shifting of the information from the counter circuit to a parallel series of binary circuit bits was difficult to perform.

Heretofore switching circuits that switch on currents and have no leakage current when off have employed mechanical relays, gas tubes, vacuum tubes and, in some cases, transistors. Relays have an inherent mechanical disadvantage in that the contact points wear out after only a relatively few cycles, and are relatively slow acting. One disadvantage with gas tubes is that they are difficult to switch off precisely with any accuracy by an electrical pulse, although they could be turned on by an electrical pulse. Vacuum tubes and transistors of the type having an emitter, collector and base require a continuous bias to keep them in the on state.

A principal object of this invention is to provide improved switching circuits using solid state switching devices wherein the circuits are compact, dependable, and accurately controlled by an electrical pulse.

A feature of this invention is the provision of a circuit means for rapidly switching on and off high currents up to 10 amperes, the off leakage current being less than $10^{-7}$ amperes.

Another feature of this invention is the provision of a self timing means for switching on the current, switching off the current, or both switching on and off the current.

Another feature of this invention is the provision of a circuit means employing solid state switching devices wherein the current can be turned on or turned off by an electrical pulse and the impedance in the off-state is more than one megohm.

Another feature of this invention is the provision of a circuit means for rapidly switching on and off current to produce one or more pulses from a single trigger pulse.

Another feature of this invention is the provision of a plurality of parallel path circuit binary means arranged sequentially and having one or more paths conducting or one or more paths non-conducting and means for shifting each conducting or non-conducting path to the next adjacent sequential path.

Another feature of this invention is the provision of a plurality of parallel path circuit binary means or bits arranged sequentially to form a binary counter, and means for shifting the information in the first plurality of parallel path circuit means to a second plurality of parallel path circuit binary means for storage.

Another feature of this invention is the provision of a circuit means for rapidly switching on and off high currents whereby a dual pulse containing a negative pulse and a positive pulse is formed simultaneously.

Another feature of this invention is the combination in a highly accurate magnetomer, of first circuit means for switching on and off relatively high currents so that the off-leakage-current is less than $10^{-7}$ amperes and the on-current is at least 2.5 amperes, and a second circuit means for counting and storing information.

Figure 11:
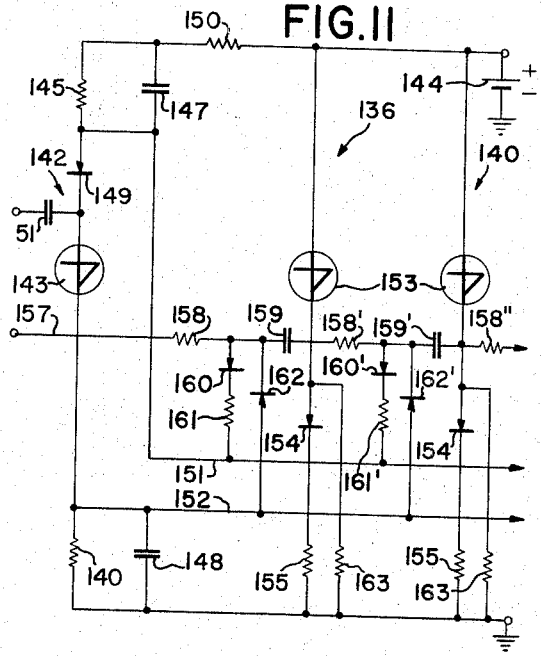
Figure 12:
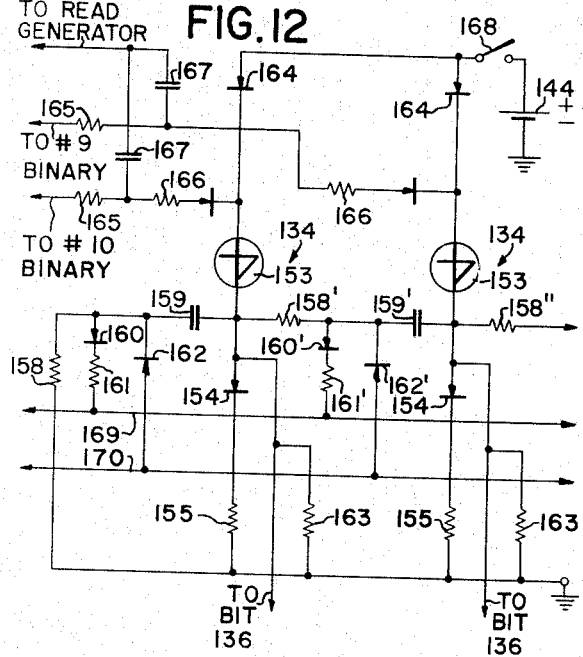
Figure 10:
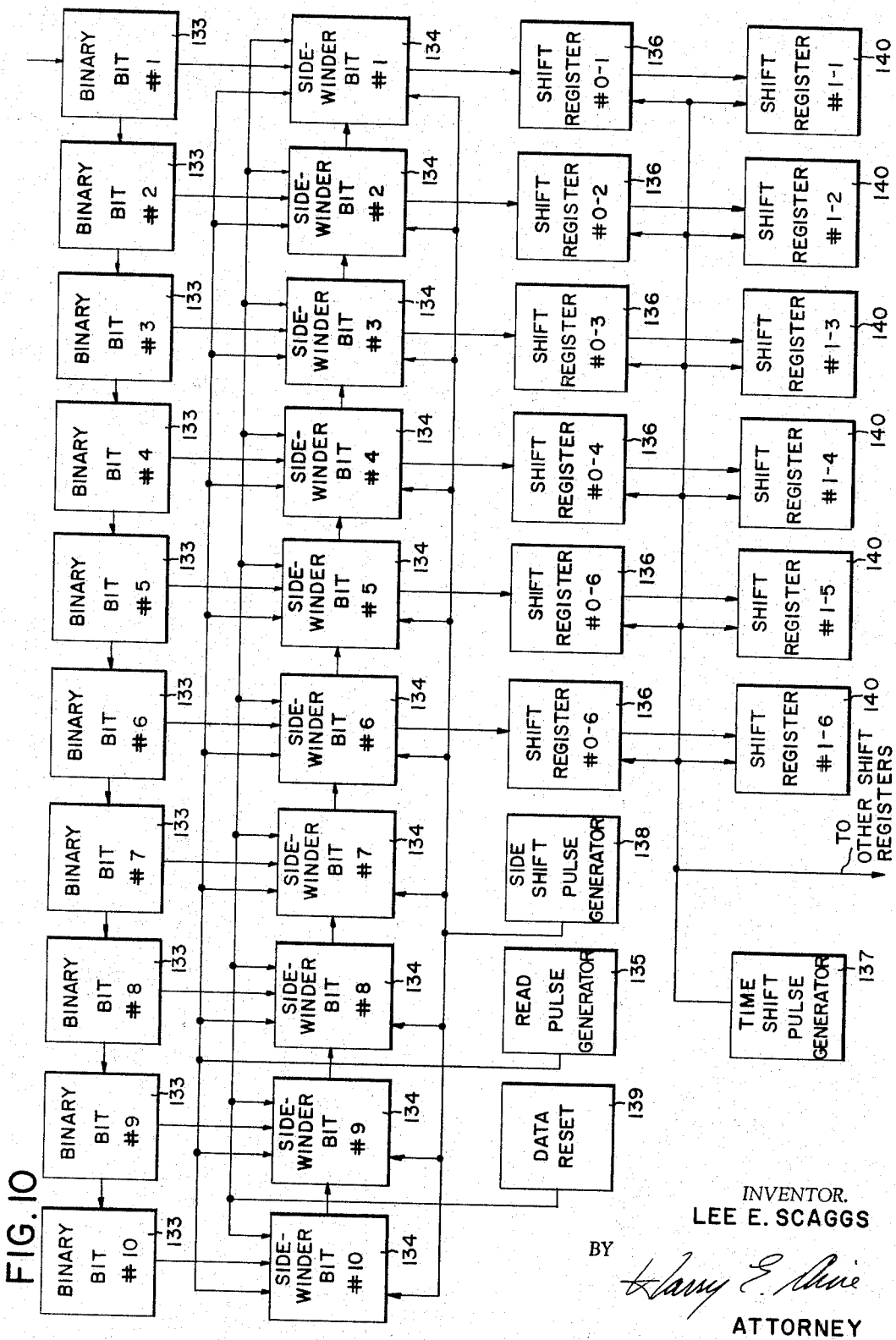

These and other features and advantages of the present invention will be more apparent after a perusal of the following specification taken in connection with the accompanying drawings wherein, FIG. 1a is a schematic structural representation of one type of solid state switching device that could be used in the invention, FIG. 1b is a schematic structural representation of another type of solid state switching device that could be used in the invention, FIG. 1c is a graphical illustration of the preferred electrical characteristics of a solid state switching device that is useful in this invention, FIG. 1d is a schematic circuit diagram representation of a switching device having the electrical characteristics as shown in FIG. 1c, FIG. 2 is a block diagram intended to show the functional interrelationship of the various components of a typical magnetometer, FIG. 3 is a schematic circuit diagram of a switching circuit, FIG. 4 is a schematic circuit diagram for automatically switching the current off after a given time, FIG. 5 is a schematic circuit diagram for automatically maintaining a circuit in the on-state for a given length of time, as determined by the time the circuit was in an off-state, FIG. 6 is a schematic circuit diagram of a self-timing delay circuit for both on and off time wherein the time-lag between states is controlled, FIG. 7 is a schematic circuit diagram for forming a trapezoidal pulse of a given time-width, FIG. 8 is a schematic circuit diagram for forming one or more pulses from a single pulse, FIG. 9 is a schematic circuit diagram showing an alternate embodiment for forming one or more pulses from a single pulse, FIG. 10 is a block diagram of a binary counter, storage, and multiplying circuit, FIG. 11 is a schematic circuit diagram for forming a dual, positive and negative, pulse for shifting and storing information and an information shifting circuit, and FIG. 12 is a schematic circuit diagram for multiplying the information of FIG. 10 by powers of two.

The novel circuit to be described has a switching means that is operated by an electrical pulse. When an electrical pulse is applied to the switching means the current therethrough is either switched on or off depending on whether the pulse is positive or negative and depending on where the pulse is applied to the switching means. The switching means also has the characteristic that when the pulse subsides, the conducting state does not immediately change back to the state that the switching means had before the application of the pulse.

There are various types of switching means that can be operated by an electrical pulse. Some of the circuits described herein produce a new and useful result even though the switching means could be gas tubes, vacuum tubes or transistors. All of the circuits show improved results when the switching means is limited to a solid state switch device that is operated by an electrical pulse.

Referring to the drawings and to FIG. 1a in particular, there is shown a schematic structural representation of one embodiment of a solid state switching device which may be used in this invention. This embodiment is known in the art as a P-N-P-N diode. The P-N-P-N diode is described in an article by Moll, Tanenbaum, Goldey and Holonyak, titled, "P-N-P-N Transistor Switches," as published in the Proceedings of the IRE, vol. 44, pp. 1174–1182. Briefly the P-N-P-N diode has alternating layers of P-semiconductive material 11 and 12 and N-semiconductive material 13 and 14 suitably bonded together. An electrical lead 15 is suitably bonded to P-layer 11 preferably with the aid of a metal base 16 that forms an ohmic connection with the P-layer 11, and another electrical lead 17 is suitably bonded to N-layer 14 preferably with the aid of a metal base 18 that forms another ohmic connection with the N-layer 14. The actual object may be as small as .28 inch long and .10 inch in diameter or smaller.

Referring to FIG. 1b there is shown a schematic structural representation of another embodiment of a solid state switching device as could be used in this invention. This embodiment is known as a P-N-P-M diode. This diode is described in an article by Philips and Chang entitled "Germanium Power Switching Devices" as published in the IRE Transactions on Electron Devices, vol. ED-5 pp. 13–18. This diode is substantially similar to the diode shown in FIG. 1a and also has alternate layers of P-semiconductive material 11' and 12' but only one layer of N-semiconductive material 13'. The layer 14' marked M corresponding to layer 14 of FIG. 1a is made of metal which is a good electron emitter. This diode has bases 16 and 18 and leads 15 and 17 the same as the diode of FIG. 1a although layer 14' and base 18 of the diode in FIG. 1b could be an integral unit.

These embodiments of switching devices have electrical characteristics substantially as shown in the graph of FIG. 1d wherein the current I is plotted against voltage V. The devices are forward biased when a positive voltage is applied to the base 16 with respect to the base 18. The diodes have a high resistance until the potential difference between the bases is as large as the switching voltage $V_s$ as indicated by the positive slope of the curve in region I. When the forward bias voltage is equal to the switching voltage $V_s$ (and has associated with it a switching current $I_s$) the devices exhibit negative resistance as shown by the negative slope of the curve in region II. The resistance of the devices decreases to a value wherein a small holding current $I_h$ at a low holding voltage $V_h$ through the devices keeps the devices at a low resistance value. The current in the devices then increases with voltage and the slope of the curve in region III is primarily the resistance of the remaining circuit employing the diodes. The scale in the I-abscissa is made much larger than the scale in the V-ordinate for illustrative purposes only as the holding current $I_h$ is very small, less than 50 milliamperes while $V_s$ may be as high as 200 v. If the polarity on the devices is reverse biased so that the base 18 is positive with respect to base 17 the devices resemble a zener diode with a breakdown voltage $V_b$. In the diode of FIG. 1a this breakdown voltage is larger than the breakdown voltage of the diode in FIG. 1b. One skilled in the art could find other solid state switching devices which have substantially the same electrical characteristics as shown by the curve in FIG. 1d.

Referring to FIG. 1c there is shown a schematic representation 19, representing the switching means. (This schematic representation will be used in the schematic circuit drawing of the application to represent a switching means.) If the switching means is the solid state device having the electrical characteristics of FIG. 1d, the switch 19 is forward biased when the lead 15 is positive with respect to lead 17. The switching means 19 can be switched on by applying a positive pulse to the lead 15, preferably through a capacitor 20, or it can also be switched on by applying a negative pulse to the lead 17 preferably through a capacitor 20'. The switch will stay on even after the pulse subsides due to the fact that its impedance is now low and the original voltage between the leads is sufficient to maintain at least holding current $I_h$ therethrough. Now that the switch is on or in the low impedance state, the switch can be reverted to its higher impedance state or off state by applying a negative pulse to lead 15 through capacitor 20. The current in the switch drops to below holding current $I_h$ to switch off the switch 19. The current remains off even after the pulse subsides. Of course, the switch can also be turned off by applying a positive pulse preferably through capacitor 20' to lead 17.

A solid state switching device that changes the state of its impedance from high to low or from low to high by the application of an electrical pulse and having the electrical characteristics as shown by the curve in FIG. 1d will be referred to hereinafter as a pulse-operated solid-state switching device. The term pulse-operated solid-state switching device includes the devices described in conjunction with FIG. 1a and FIG. 1b but is not in any way limited to the devices as shown and described.

There are other types than those shown in FIG. 1a and FIG. 1b of pulse-operated solid-state switching devices which charge to a conducting state when an electrical pulse is applied; for example, the device in FIG. 1a could have an ohmic junction to either layer 12 or 13 or both and the pulse applied to any one of the ohmic junctions.

Referring to FIG. 2 a block diagram of a typical magnetometer is shown. The magnetometer has a signal head 21 containing primarily a sample of matter of known nuclear character surrounded by a large coil of wire which serves the double purpose of applying a strong magnetic field to the sample to produce nuclear polarization of the same and then to pick up the signals produced by the precessing atomic nuclei. Polarization is produced by closing a coil switch 22 to connect the coil in head 21 to a direct current power supply 23. Nuclear precession is formed by opening coil switch 22 to terminate the current flow. When the switch 22 is open a high voltage appears across the coil of the signal head 21 because of its inductance. This voltage is prevented from reaching dangerous proportion by resistive element 24. A short time after opening switch 22, long enough for the current in the coil to decrease to zero, a measuring circuit switch 26 is closed connecting an amplifier 27 and adding a capacitor 28 to the coil forming a tuned circuit, tuned substantially to the precession frequency of the nuclei. The time interval between the opening of coil switch 22 and the closing of measuring circuit switch 26 is determined by a time delay switch or sequencer 29 so that capacitor 28 is connected across the coil only after the transients caused by cutting off the current from the power supply 23 have subsided. The precession frequency of the sample nuclei in the signal head 21 is then only related to the strength of the magnetic field in which the precession is taking place. Thus, when the precession frequency of the nuclei is measured the strength of the unknown magnetic field may be determined. The amplified precession frequency from the amplifier 27 is limited by a limiter 31 and is transformed into a square wave. The number of cycles of the square wave is then counted by a counter 32 which in this embodiment counts a prescribed number of cycles. At the conclusion of the count by counter 32, a relay 33 is tripped by the counter which opens the switch 26. During the time counter 32 is counting a prescribed number of cycles of the square wave, a reference counter 34 is used to count the cycles from a standard frequency source 36 which frequency is fed into an electronic relay 37. Electronic relay 37 is switched on when counter 32 starts to count and is switched off when counter 32 stops to count. Thus, the number of cycles counted by the reference counter 34 of the standard frequency is directly related to the precession frequency from the signal head 21.

The coil switch 22 should preferably switch on and off between 2.5 and 3 amperes at a fairly high frequency and also should have less than one microampere of leakage current. A mechanical switch, although it completely interrupts the current flow is unreliable and slow. Referring to FIG. 3, an improved switching circuit is shown wherein the leakage current is practically negligible and less than $10^{-7}$ amperes. The switching circuit consists primarily of two series circuits, a first series circuit comprising a switching means 41, a rectifying diode 42, another switching means 43, the coil in the signal head 21, and the power supply 23 and a second series circuit comprising a switching means 44, a rectifying diode 46, a resistor 47, and the power supply 23. (All rectifying diodes are preferably solid state diodes, but vacuum tube rectifiers could be used.) One terminal of the power supply is preferably grounded and a resistor 49 is connected between ground and to the junction of diode 42 and switching means 43, although in some other embodiments resistor 49 could be connected between ground and the junction of diode 42 and switching means 41. The switching means 41 and 43 preferably have a high impedance in the megohm range in the off-state, and have a low impedance less than a couple of ohms in the on-state. In the off-state the voltage drop across the switching means 43 is only a very small fraction of the voltage drop across the switching means 41 since the resistance of resistor 49 is chosen to be much smaller than either of the non-conducting resistances of the switching means 41 or 43. Actually the ratio of voltage drop across switching means 43 (or resistor 49) to the voltage drop across switching means 41 in the off-state is proportional to the ratio of the resistance of resistor 49 to the off resistance of switching means 41. Thus the leakage current in switching means 43 and the coil can be made practically nil by the proper choice of resistance value. A circuit as thus described need not be limited to a direct current power supply. Switching means 41 and 43 could be, for example, transistors, vacuum or gas tubes, or pulse operated solid-state switching devices that have an off-impedance of more than $10^6$ ohms and an on-impedance of less than a few ohms.

If the switching means 41, 43, and 44 in this circuit are limited to pulse-operated solid-state switching devices, the circuit performs another useful function in that the current to the signal head 21 could be switched on and off by an electrical pulse that is supplied from a remote station. This circuit has no mechanical parts to wear out.

The circuit with pulse-operated switching devices for switches 41, 43 and 44 operates as follows: When the power supply 23 is initially applied, neither series circuit is conducting. Hence the switching voltage of switching means 44 must be less than the power supply voltage, and the sum of the switching voltages of switching means 41 and 43 must be greater than the power supply voltage. Then switch 44 is made to conduct by applying a negative pulse to capacitor 51 and a capacitor 52 connected between the two series circuits. The current can now be switched on in the circuit containing the signal head 21. If a positive pulse of sufficient voltage is applied to capacitor 51 the current through the switch 44 is lowered to below holding current to switch it off. The junction of diode 46 and resistor 47 now drops rapidly to ground potential. Since capacitor 52 was charged with a positive charge on the plate connected to the switch 44, then when switch 44 is switched off, capacitor 52 discharges placing a forward bias of twice the power supply voltage across switch 41 to switch it on. Hence, switch 41 must have a switching voltage less than twice the power supply voltage. At the same time, the diode 42 prevents the switch 43 from being back biased and from grounding the large negative charge on the plate of capacitor 52 connected to switch 41 while diode 46 prevents switch 44 from being back biased. The switching voltage of switch 43 happens to be less than the power supply voltage, and thus switch 43 switches on. Since the coil in the signal head 21 is a tuned load, a resistor 53 and a zener diode 54 are connected in series across the signal head 21 to prevent switch 43 from switching off when the current in the coil cycles to below holding current. If the load was not tuned, resistor 53 and zener diode 54 could be eliminated. (Zener diodes as used herein refer to devices which are fully conductive when biased in one direction, but are only conductive above a given voltage when the bias is reversed. All zener diodes as used herein are represented schematically as item 54 in FIG. 3.)

The current in the signal head coil is switched off by applying a negative pulse to capacitor 51, switching on switch 44. Since capacitor 52 was reverse charged then when switch 44 was conducting, positive charge on the plate of the capacitor 52 passes through diode 42 momentarily lowering the current in switch 41 to below holding current causing switch 41 to switch off. Then, switch 43 switches off.

Referring to FIG. 4 another embodiment of the switching circuit is shown wherein the current to the coil in signal head 21 is switched on by a pulse but the current switches off automatically after a fixed period of time. (Items having the same numerals as in FIG. 3 perform substantially similar functions and the switching means are pulse operated solid-state switching devices.) Switches 41, and 43, diode 42, and the power supply 23, and the coil in the sensing head 21 form a series circuit with the negative side of the power supply 23 grounded. Another direct current power supply 55, a rectifying diode 57, switch 44, diode 46, and the resistor 47 form another series circuit with the positive terminal of the power supply 55 grounded. As before, switch 44 is made to conduct by applying a negative pulse to capacitor 51. The capacitor 52 now remains discharged as both plates are at ground potential. As before, a positive pulse of sufficient value applied to capacitor 51 switches off switch 44. The junction of diode 46 and resistor 47 drops rapidly to below ground potential applying a negative pulse of sufficient value through capacitor 52 to switch on switch 41 and then switch 43. A capacitor 56 that is connected parallel to the diode 57 charges through a potentiometer 58 that is connected across the two parallel circuits so that a positive charge is placed on the side of the capacitor connected to the switch 44. When capacitor 56 reaches a charge of about ⅔ of the potential of power supply 23, switch 44 switches on, since the voltage across the capacitor 56 adds to the voltage of power supply 55 to above the switching voltage for switch 44. The capacitor 52 when switch 44 is switched off is charged to a potential equal to the sum of power supplies 23 and 55. Then, when switch 44 switches on, diode 42 prevents the positive charge on the capacitor 52 from bypassing to ground through resistor 49 and the current in switch 41 is lowered to below holding current. The length of time that switches 41 and 43 remains on is directly dependent on the value of potentiometer 58 and capacitor 56. Since the resistance value of the potentiometer 58 is adjustable the on-time constant for the coil can be controlled.

Referring to FIG. 5 another embodiment of the switching circuit is shown wherein the on-time is the same length as the off-time and the on-time starts with the application of a pulse. (Items having the same numerals as in FIG. 3 perform substantially similar functions and the switching means are pulse-operated solid-state switching devices.) This circuit operates as follows: When switch 44 is conducting a capacitor 61 is charging through a diode 62 and a resistor 63. Capacitor 61, diode 62, and resistor 63 are connected in series, with the resistor 47 connected parallel thereto. When a positive trigger pulse is applied to capacitor 51 switch 44 is switched off causing as before switches 41 and 43 to be switched on, since capacitor 52, as in FIG. 3, was charged. Also as in FIG. 3, diode 42 prevents switch 43 from being back biased. The emitter of a transistor 64 is now at nearly ground potential and the base is at some potential above ground since the base is connected to the positively charged plate of capacitor 61 through the resistor 63. Diode 62 prevents capacitor 61 from discharging through resistor 47. The transistor 64 is forward biased to saturation. Meanwhile a zener diode 66 prevents the potential across switch 44 from becoming equal to the voltage of supply 23 thereby preventing premature switching of switch 44. As long as transistor 64 is held at saturation by the charge on capacitor 61, the voltage across the switch 44 can be held to below the switching voltage by the zener diode 66 on resistor 67. When the transistor 64 is conducting less current than saturation the potential drop in each resistor 68 and 69 decreases, increasing the potential across switch 44. The junction of the zener diode 66 and resistor 67 is at a lower potential than the junction of resistor 68 and 69, when the current in resistor 69 drops to a low value and a diode 70 prevents the two junctions from shorting. When the voltage across switch 44 increases to above switching voltage, it switches on. Then, as before, in turn switches 41 and 43 switch off.

The size of the capacitor 61 and the resistor 63 determine the on-time that the coil current is on. This on-time is related to the off-time of the coil current since the charge on capacitor 61 keeps increasing only while the coil current is off until a full charge is obtained.

Referring to FIG. 6 another embodiment of the switching circuit is shown wherein the circuit is self-timing for both on and off time. This circuit is substantially a multivibrator having a relatively long delay time between on and off states. (Items having the same numerals as in FIG. 3 perform substantially similar functions, and the switching means are pulse-operated solid-state switching devices.) This circuit requires one switch 44' to switch on the switches 41 and 43 and another switch 44" to switch off the switches 41 and 43. When switches 41 and 43 are off, the resistor 49, as in FIG. 3, maintains the junction of the two at substantially ground potential. Thus, the junction of resistors 71 and 72, that are series connected between two zener diodes 73 and 74, and the power supply 23, is at the same potential as the junction of diodes 41 and 43 since the junction is common. When the junction of resistors 71 and 72 is at ground potential the zener diode 73 applies a limited voltage across a series circuit including a resistor 75 and a capacitor 76 causing the capacitor 76 to charge with a given time-constant which is the off-time for the circuit. When capacitor 76 charges to the switching voltage of switch 44' it switches on discharging the capacitor through the primary of a transformer 77. The voltage is stepped up by the transformer, to where a positive pulse having sufficient voltage to switch on switch 41 is applied to a capacitor 52'. As in FIG. 3, switches 41 and 43 are switched on. The diode 42 steers the positive pulse from the capacitor 52' to the switch 41. Now, the voltage of the common junction of resistors 71 and 72 is biased positive and substantially equal to the power supply 23. A resistor 78 across the primary of the transformer 77 dampens the oscillation of this circuit.

Since the junction of resistors 71 and 72 is now at the positive potential of the power supply and the zener diode 74, maintaining a predetermined potential across a series circuit including a resistor 79 and a capacitor 80, the capacitor 80 charges with a given time-constant which is the on-time for the circuit. Then, when capacitor 80 charges to the switching voltage of diode 44" it switches on. Since capacitor 52" when switches 41 and 43 are on was charged to the potential of the power supply 23, a positive pulse is applied to the junction of switches 41 and 43 when switch 44" is switched on causing switch 41 to switch off and after the capacitor 52" discharges through switch 43, it switches off.

A rectifying diode 81 prevents the diode 44" from being back biased when the current is switched on in the signal head 21. Another rectifying diode 82 across the coil in the signal head 21, absorbs the power resulting from the collapse of the magnetic field in the coil. As before if signal head 21 is a resistive load, diodes 54 and 82 and resistor 53 would not be needed. A rectifying diode is not needed in this embodiment between diode 41 and 43 since capacitor 52" is not charged when diode 43 is off and thereby it cannot be back biased. Zener diodes 73 and 74 and resistors 71 and 72 are used to insure a known voltage across each series circuit including resistors 82 and capacitor 83 so that the time constant does not change.

The above circuits switch currents on and off after relatively long time intervals. This invention as mentioned above, also switches current on and off very rapidly whereby one or more pulses that are time-spaced between each pulse could be formed. Referring to FIG. 7, a one shot multivibrator is shown wherein a pulse is produced in the form of a trapezoid 83 in an output lead 84'. The one shot multivibrator has a series circuit including a pulse-operated solid-state switching device 84, a rectifying diode 85, a resistor 86, and a direct current power supply 87 with the negative side of the power supply grounded. A capacitor 88 in series with a resistor 89 is connected parallel to the switch 84. The junction of switch 84 and diode 85 is biased to a potential more negative than ground potential by a power supply 90 through a resistor 91. Resistor 91 has a much higher value than resistor 86 for reasons which will be explained hereinafter. The switching voltage of switch 84 is lower than the sum of the voltages of power supplies 87 and 90 but higher than the voltage of power supply 87 causing switch 84 to be normally on. Since resistor 86 has a lower resistance than resistor 91, the current primarily passes through resistor 86. When a positive pulse is applied to a capacitor 92 the current in the switch 84 drops to below holding current and switches off. Diode 85 prevents the positive pulse from passing through to ground through resistor 91. Capacitor 88 will now charge, first to potential of power supply 87 in a predetermined fast time-constant as determined by resistors 86 and 89 and capacitor 88. Then the capacitor 88 will charge to the voltage of the sum of the power supplies in a longer time-constant as now determined by resistors 89 and 91 and capacitor 88. Then, when the voltage across the capacitor reaches the switching voltage of the switch 84 it switches on. (Resistor 89 is used to limit the initial current within the switch 84.) The voltage at the junction of switch 84 and diode 85 rises rapidly to above ground potential when switch 84 switches on. The voltage at this junction forms the pulse-shape 83 that has a substantially trapezoidal form which pulse is delayed in time in relation to the pulse supplied to capacitor 92. The trapezoidal pulse 83 is extracted from the circuit through lead 84'.

The circuit shown in FIG. 7 could be used to trigger another similar one-shot multivibrator circuit which in turn triggers another similar circuit, etc. whereby a train of time spaced pulses is formed. Referring to FIG. 8 there is shown a series of four sequentially arranged one shot multivibrator circuits preferably of the type shown in FIG. 7, although more or less circuits could be used. This circuit has an additional feature wherein the actual number of pulses that one needs could be controlled from a remote control station. (Items having like numbers as in FIG. 7 perform substantially similar functions.) The circuit initially starts with all the switches 84, 84', 84'', 84''' on, all the capacitors 88, 88', 88'', 88''', discharged and also, capacitors 92, 92', 92'', 92''' discharged.

As in the circuit shown in FIG. 7 a positive pulse is supplied to capacitor 92 switching off switch 84 and causing capacitors 88 and 92' to charge. As capacitor 88 is charging to the voltage of power supply 87, a negative pulse 93 is first transmitted through capacitor 92' when switch 84 was switched off. Then when diode 84 switches on a positive pulse 94 having a peak voltage above ground equal to the voltage of power supply 87, is transmitted through capacitor 92' causing switch 84' to switch off. A rectifying diode 95 is connected between switch 84 and capacitor 92' to prevent switch 84 from being turned to the off state when switch 84' turns on. Now capacitors 88' and 92'' charge and when switch 84' switches on, switch 84'' will switch off. In turn, each switch 86, 86', 86'', and 86''' sequentially switches off and then on, in turn, after a time delay.

In this embodiment the amplitude of the positive pulse to the junction of diodes 85 to 85''' and capacitors 92-92''' is preferably limited by zener diodes 96, 96', 96'', and 96''' and resistors 97, 97', 97'' and 97''' in series. The zener diodes 96 to 96''' are connected parallel with resistors 86, 86', 86'', and 86''' respectively. Resistors 97 to 97''' are relatively smaller than resistors 86 to 86''' since they must only be large enough to produce the required voltage drop thereacross. The limited pulse voltage at each junction formed by the resistors 97 to 97''' and the zener diodes 96 to 96''' is extracted from the circuit through capacitors 98, 98', 98'' and 98''' respectively. The zener voltage of diodes 96–96''' preferably limits the amplitude of the positive pulse to ½ the voltage of power supply 87 and also power supply 90 as these voltages are preferably equal. Then the plate of each capacitor 98 to 98''' connected to each zener diode 96 to 96''', respectively, would swing through a maximum positive voltage of ½ the voltage of the power supply 87. The other plates of capacitors 98 to 98''' are biased at progressively lower voltages than the plate of the previous capacitor in sequential order. The other plate of capacitor 98 is preferably connected to the junction of equal value resistors 99 and 100 and preferably is biased to pulse ½ the voltage of power supply 87. The resistor 99 is connected to the power supply 87 and the resistor 100 is grounded. The other plate of capacitor 98' is preferably grounded by a resistor 101. The other plate of capacitor 98'' is preferably connected to the junction of equal valued resistors 102 and 103 and preferably is biased to minus ½ the voltage of power supply 90. The resistor 102 is grounded and resistor 103 is connected to the negative terminal of the power supply 90. The other plate of capacitor 98''' preferably is biased to the negative potential of power supply 90 by a resistor 104. Resistors 100, 101, 103 and 104 must be of sufficient value so that the positive pulses that are formed are steered through rectifying diodes 105 to 105''' and into each of four parallel circuits 106 to 109 each containing a resistor 110 and capacitor 111. One of the diodes 105 to 105''' is connected to one of the circuits 106 to 109, respectively, through the junction of a resistor 110 and a capacitor 111. The other end of each resistor 110 is connected to a common terminal 112 of a four pole switch having four poles 113–114–115–116 that are biased at progressively higher potential by a power supply 117. Pole 116 should preferably be biased positive to a value equal to the potential of junction of capacitor 98 and diode 105 but more positive than the potential of junction of capacitor 98' and diode 105'. Pole 115 is shown grounded so that it is preferably at the potential of the junction of capacitor 98' and diode 105' although its potential value could be between the potential of the junction of capacitor 98' and diode 105' and more positive than the potential of junction of capacitor 98'' and 105''. In turn, pole 114 should preferably be biased at a potential value equal to the potential of the junction of capacitor 98'' and diode 105'' but more positive than the potential of the junction of capacitor 98''' and diode 105''', and then, pole 113 should preferably have a potential equal to or lower than the junction of capacitor 98''' and diode 105'''. Thus when pole 116 is connected to terminal 112, one positive pulse would be produced at a lead 118; when pole 115 is connected two positive pulses would be produced at lead 118; when pole 114 is connected three positive pulses would be produced at lead 118; and when pole 113 is connected four positive pulses would be produced at lead 118. The above principle can be expanded to where more or less than 4 pulses could be produced at lead 118, just by adding or removing the one shot multivibrator circuit of FIG. 7 to the circuit of FIG. 8 and each junction formed by capacitors similar to 98 and diodes similar to 105 are biased sequentially to predetermined potentials. Of course, additional circuits similar to circuits 106–109 would be needed. If each series circuit 106–109 has separate control voltages, single or multiple pulses could be chosen in time sequences, as for example, only the circuit 106 could then be biased to the potential of pole 116 and only circuits 108 and 109 could then be biased to the potential of pole 114. This arrangement would shut off only the pulse from capacitor 98', and only the pulses from capacitors 98, 98'' and 98''' could be made to be seen at lead 118. The pulses are useful in that they could be used to command a shift register to shift one, two, three, four or more times, as will be shown hereinafter.

Referring to FIG. 9, another embodiment of a circuit that produces one or more time-spaced pulses is shown. This circuit includes two parallel circuits having pulse-operated solid-state switching devices. (This circuit combines features of the circuit in FIG. 3 to the circuit of FIG. 7. The items having the same numbers as in FIG. 3 and 7 perform substantially similar functions.) The first parallel circuit includes the switch 44, the rectifying diode 46, the resistor 47 and the power supply 87. The second parallel circuit includes the rectifying diode 42, the switch 41, the resistor 49, and the power supply 87. The negative terminal of power supply 87 is grounded. Normally switch 44 would be conducting and switch 41 is off as will be seen hereinafter. A positive pulse when applied to the junction of switch 41 and diode 42 through the capacitor 51, switches on switch 41. The capacitor 52 being charged supplies a positive pulse to switch 44, switching it off. When switch 41 switches on, a capacitor 122 will charge through a resistor 123, to a potential that is greater than the potential of power supply 87 as the other power supply 90 is connected within the series circuit formed by switch 41 and diode 42, resistor 123, capacitor 122, and power supplies 87 and 90. After a lapse of time, as determined by resistor 123 and capacitor 122, capacitor 122 becomes charged to the switching voltage of a pulse-operated solid-state switching device 125, to switch it on causing the capacitor 122 to discharge through a resistor 126. After the capacitor 122 discharges the switch 125 rapidly switches off, as resistor 123 does not supply holding current for the switch. One positive pulse is produced at the junction of diode 125 and resistor 126. When switch 125 switches off, capacitor 122 begins to charge again and when it charges again to the switching voltage of switch 125, it switches on and off again to produce another pulse. Pulses would be produced as long as diode 41 remains conducting.

To produce pulse trains with a given number of pulses timing-circuit means are provided to switch switch 44 on and switch 41 off after a predetermined length of time. One method would be to supply a timed negative pulse to capacitor 51 to switch off switch 41, thus eliminating the need for switch 44 and its related circuit. The timing means could also comprise a self-timing circuit which as shown in the schematic diagram causes the capacitor 88 to charge after the predetermined time to the switching voltage of switch 44 switching it on in a similar manner diode 84 was switched on in the multivibrator of FIG. 7. The charging time-constant of capacitor 88 could be changed so that the switch 41 stays conducting for various time lengths to produce any given number of pulses at the junction of switch 125 and resistor 126. The charging time-constant is determined by which of the four parallel resistors 127–130 are connected in series between the capacitor 88 and power supply 90. A four pole switch 131 disposed between the power supply 90 and the four parallel resistors 127–130 determines which resistor should be placed in series with capacitor 88. The resistors 127–130 have different values so that when resistor 127 is connected in series the charging time-constant for capacitor 88 charges it to the switching voltage of switch 44 in sufficient time for one pulse to be produced at the output. Then, when each resistor 128 to 130 is in turn connected in series with capacitor 88, the charging time-constant for capacitor 88 charges it to switching voltage of switch 44 in sufficient time for two, three, and four pulses, respectively, to be produced at the output. Potentiometers 127'–130' are added in series to the fixed resistors 127–130 because the switching voltage for the pulse-operated solid-state switching devices may vary over a range of plus or minus 4%. The charging time-constant for the capacitor 88 could be readily adjusted to compensate for tolerances in switching voltages. One can readily see that more resistors could be added in parallel wherein the circuit produces more than 4 pulses. A rectifying diode 132 is placed between the capacitor 88 and diode 44 so that capacitor 91 does not charge through resistors 47 to insure the proper time-constant for charging capacitor 88.

The above pulse generators are applicable to drive a shift register in a counting device. Referring to FIG. 10 a block diagram of a typical counter 34, as used, for example, in the magnetometer of FIG. 2 is shown. The signal from the standard frequency source 36 is fed by the relay 37 into a series of binary circuit bits 133 arranged sequentially and in this embodiment only ten binary bits arranged from #1–#10 sequentially as shown. The invention is not limited to any given number of binary bits 133. The standard frequency in the reference counter 34 is preferably changed to pulses, a pulse for every cycle. Then, in the standard way that binary circuit bits count, the first pulse to binary bits 133 switches on #1 bit since at the beginning of the count all the binaries are off. The next pulse then switches off the #1 bit and switches on #2 bit indicating that two pulses were guided into the binary bits 133. The third pulse switches on #1 bit and then the fourth pulse switches off #1 bit, also switches off #2 bit, and switches on #3 bit, indicating that four pulses were counted. Thus the binary bits 133 could count to any given number of pulses.

After the reference counter 34 turns off the supply of pulses the information in the binary bits 133 is required to be shifted for reading to "sidewinder" bits 134 also arranged sequentially from #1–#10. The sidewinder bits 134 could store the information until one desires to read it so that the binary bits 133 could count again. The information in the binary bits 133 is shifted by supplying a read pulse from a read pulse generator 135 to each sidewinder bit 134. Then the binary bits 133 are reset in a standard manner so that they are free to count again.

The information now in the sidewinder bits 134 is further stored in a series of first shift register bits 136 by applying a pulse from a shift pulse generator 137 to each shift register bit 136. In the embodiment shown there are only six first-shift-registered bits 136 numbered from #0–1 to #0–6. Thus only the information in the sidewinder bits 134 from #1–#6 bits could be stored in the shift register circuit 136. In some applications the information counted is large wherein some of bits from #7–#10 of the binary bits 133 were required to count. This information in #7–#10 would be lost as the shift register bits 136 only can store information in #1–#6 sidewinder bits 134. A side-shift pulse is supplied by a side-shift pulse generator 138 to shift the information in the sidewinder bits 134 to the next adjacent sequentially arranged bit. For example, one pulse is used to shift the information in #10 bit to #9 bit, in #9 bit to #8, #8 to #7, etc.; two pulses shift the information in #10 bit to #8 bit, in #9 bit to #7 bit, in #8 bit to #6 bit, etc. Three pulses shift the information in #10 bit to #7 bit, in #9 bit to #6, etc.; and four pulses shift the information in #10 bit to #6, etc. Thus, after the information is side shifted in the sidewinder bits 134, the information is stored in the shift register bits 136 without losing valuable information. Of course, for each shift in the sidewinder bit 134, the information in the shift register bits 136 must be multiplied by two to obtain the correct count. The sidewinder bits 134 are reset by a pulse from pulse generator 139 before information is restored therein.

After the information is stored in the first series of shift register bits 136, more series of shift register bits such as second-shift-register bits 140 could be used to save the previous information when one or more readings are required. Thus the information in the first-shift-register bits 136, #0–1 to #0–6 could be shifted to the second-shift-register bits 140, #1–1 to #1–6 respectively, at the same time the information in bits 134 are shifted to bits 136 by shift pulse generator 137. Also as more series of shift register bits are needed to store information they could be operated by the same shift pulse generator 137.

Referring to FIG. 11 there is shown a typical circuit performing the function of shifting the information from one bit to the next sequentially arranged bit by preferably using a dual pulse. The dual pulse consists of two simultaneous pulses, a negative pulse and a positive pulse, which are produced by a dual pulse circuit 142 located to the left of FIG. 11. Circuit 142 is a typical circuit as used in pulse generators 135, 137, and 138 of FIG. 10, but these items are not limited to the circuit 142. The dual pulse generator comprises a pulse-operated solid-state switching device 143, connected across a power supply 144 with resistors 145 and 146 connected in series, one on each side of the switch 143. The negative terminal of power supply 144 is grounded in this circuit. In parallel with each resistor 145 and 146, is connected capacitor 147 and 148 respectively. When diode 143 is not conducting neither capacitor 147 nor 148 is charged. A positive trigger pulse applied to a capacitor 51 switches diode 143 on. A rectifying diode 149 prevents the positive pulse from passing through to the power supply 144. When switch 143 is on, the capacitors 147 and 148 will be charging. When the capacitors are completely charged, switch 143 switches off as the resistors 145 and 146 limit the current to below holding current for the switch 143. Capacitors 147 and 148 then discharge through resistors 145 and 146 respectively. A negative pulse is formed in a lead 151 and a positive pulse is formed in a lead 152. Thus, every time a positive pulse is applied to capacitor 51 to switch on switch 143 a dual pulse is formed. The positive pulses are preferably supplied by a circuit as shown in either FIG. 8 or FIG. 9 wherein one can control the number of pulses by simply switching a switch from a remote location.

If circuit 142 is used as the pulse generator 137 of FIG. 10, then, the dual pulses are supplied to shift register bits 136 and 140. Each shift register bit, as for example #0–1 bit and #1–1 bit, includes a pulse-operated solid-state switching device 153, a rectifying diode 154 and a resistor 155 connected in series across power supply 144. Since the same power supply is used to supply power to the bits 136, 140 and the pulse generator circuit 142, an isolating resistor 156 is placed between the junction of switch 153 and power supply 144 and the junction of resistors 145 and capacitor 147 to isolate the pulse circuit from the bits. As mentioned in relation to FIG. 10, more shift register bits may be added; therefore, similar circuit bits containing switch 153, diode 154, and resistor 155 may be added to the right of bit 140 across the power supply 144.

The information from the sidewinder bits 134 as to whether it is on or off is supplied by a lead 157 through a resistor 158 and a capacitor 159 to the junction of switch 153 and diode 154. Preferably if the sidewinder bit is on, lead 157 is biased positive; if it is off, the lead 157 is grounded. The junction of switch 153 and diode 154 of each bit is connected to the junction of switch 153 and diode 154 of the next sequential bit through a resistor 158' and a capacitor 159' similar to resistor 158 and capacitor 159, etc. The junction of resistor 158 and a capacitor 159 is connected to leads 151 and 152 through steering diodes, a rectifying diode 160 and resistor 161 between the junction and lead 151 and a rectifying diode 162 between the junction and lead 152.

The circuit operates as follows: Assuming the sidewinder bit to lead 151 is on and all the shift register bits are off, then capacitor 159 would be charged and capacitor 159' would not be charged as the junction of diodes 153 and 154 are at ground potential. This causes diode 160 to be zero biased and diode 162 to be back biased. Diodes 160' and 162' between bits 136 and 140 are zero biased. The dual pulse is formed by circuit 142 with the negative pulse applied to lead 151 and the positive pulse is applied to lead 152. Since diode 162 is back biased the positive pulse is prevented from passing therethrough. The negative pulse passes through diode 160 and through capacitor 159 to switch on the switch 153 in bit 136. The positive and negative pulse both pass through diodes 160' and 162' respectively and cancel out. The conducting state of bit 140 is not affected. The resistor 161' prevents lines 151 and 152 from being short circuited so that the dual pulse is preserved to act on other bits further down the line. Now if the lead 157 is grounded, and bits 136 and 140 are non-conducting, capacitors 159 and 159' are not charged and therefore, when the dual pulse is applied no changes in the conduction states of the bits occur. Resistor 161 performs the same function as resistor 161'. If all the bits 136 and 140 are conducting and lead 157 is biased positive, diodes 160, 160' would all be zero biased and diodes 162, 162' would be back biased. The positive pulse of the dual pulse is thus blocked by diodes 162, 162', preventing the switching off of bits 136 and 134. The negative pulse would now tend to switch on a circuit that was on. If lead 157 is grounded and bit 136 is conducting with bit 140 non-conducting, both capacitors 159 and 159' would be charged with diodes 160 and 162' back biased and diodes 162 and 160' zero biased. Then, the positive pulse of the dual pulse would switch diodes 153 off in bit 136 and the negative pulse would switch on bit 140. In a sense the information was shifted to the right or to the next sequential disposed bit. Thus, whenever a dual pulse is applied, any information that was in the bit sequentially arranged before the particular bit, the information of that previous bit is shifted to the particular bit, and the information in the particular bit is shifted to the bit sequentially arranged after the particular bit.

Resistor 158 serves the function of preventing the pulse traveling through either diode 162 or 160 from affecting the conducting state of the previous bit. Resistor 158' serves a similar function. A resistor 163 is connected across the diode 154 and resistor 155 to provide a margin of safety so that the conducting state of the previous bit is not affected by what happens in the next bit.

Referring to FIG. 12, there is shown a typical circuit representing the sidewinder bits 134. (Items having the same numbers as in FIG. 11 perform substantially similar functions.) Each sidewinder bit 134, like the shift register bits 136 and 140, included the switch 153, rectifying diode 154, and the resistor 155 connected in series with the power supply 144, but another rectifying diode 164 is posed between diode 153 and the power supply. Only the sidewinder bits 134 representing #10 bit, and #9 bit are shown (the other bits #8 to #1 are not shown and may be added to the right of the figure). The junction of switch 153 and diode 154 of one bit is connected to the junction of diodes 154 and 153 of the next bit through resistors 158 and capacitors 159 with the resistor 158 leading to the #10 bit grounded. Each binary bit 133 of FIG. 10 is connected to its corresponding sidewinder bit 134 through two series resistors 165 and 166 to the junction of diode 164 and switch 153. The binary bit 133 could be biased positive for on, and grounded for off. Although other biasing voltages may be used depending on the amplitude of the read pulse. The read pulse from the pulse generator 135 is applied to each junction of resistor 165 and 166 through parallel capacitors 167, one for each junction. The data reset pulse generator 139 could be a mechanical switch 168 in the lead from the power supply to diodes 164. The bits are all turn off when the switch 168 is opened and do not turn on by the switch closing. Like in FIG. 11, the negative pulse of the side-shift pulse-generator 138 (FIG. 10) is applied to a lead 169 while the positive pulse is applied to a lead 170. This circuit operates in the same manner as the circuit of FIG. 11 operated when information is required to be moved from the left bit to the right bit, as read in the drawings.

When information is required to be moved into the sidewinder bits 134 from the binary bits 133 a positive read pulse is applied to capacitor 167. The positive voltage from the binary bits 133 that are on would add to the positive read pulse so that those sidewinder bits have applied to their switch 153 a voltage larger than switching voltage, but those binary bits 133 that are off have insufficient voltage applied to them so that the added voltage cannot switch on the switch 153 on those particular sidewinder bits.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A circuit including a first power supply, at least first and second solid-state switching means and a load all connected in series, each of said switching means having a high positive resistance in the off state for applied voltages less than the switching voltage of said switching means, each of said switching means passing rapidly through a region of negative resistance into a region of low positive resistance which is the on state when the applied voltage exceeds the switching voltage, said power supply producing a voltage less than the sum of the switching voltages of said first and second switching means, but greater than the minimum voltage required to maintain said switching means in the on state when said switching means have been switched on; and a first resistor connected in parallel with said resistance load and one of said switching means, said resistor having a value less than said high positive resistance of the parallel-connected switching means and providing a shunt path for direct current whereby leakage current is diverted from said load when said switching means are in the off state.

2. The circuit of claim 1 further including pulse circuit means for providing pulses to switch one of said switching means on and off.

3. The circuit of claim 2 wherein said pulse circuit means comprises limiting amplifier means responsive to pulses from an external source for providing pulses to switch one of said switching means on and off.

4. The circuit of claim 3 wherein said limiting amplifier means comprises the series combination of a third switching means and second resistor, said series combination being connected across said power supply, said third switching means being operatively connected to at least one of said first and second switching means to provide said pulses thereto, said third switching means having a switching voltage greater than said power supply voltage.

5. The circuit of claim 4 further including a first diode connected in series between said first and second switching means, said first diode being poled to conduct current from said power supply, a second diode connected in series between said third switching means and said second resistor, said second diode being poled to conduct current from said power supply, a first capacitor having one terminal connected at the junction of said first switching means and said first diode and having the other terminal connected at the junction of said second resistor and said second diode, and a second capacitor having one terminal connected at the junction of said third switching means and said second diode.

6. The circuit of claim 2 wherein said pulse circuit means comprises limiting amplifier means for providing a first pulse to switch one of said switching means on, said first pulse being produced in response to an input pulse from an external source of pulses, and delay circuit means operatively connected to at least one of said switching means and responsive to the current flowing therein to provide a delayed second pulse at a selected time interval after said first and second switching means are switched on to switch one of said switching means off.

7. The circuit of claim 6 wherein said limiting amplifier means comprises a third solid-state switching means, second resistor and second power supply in series; and said delay circuit means comprises a first capacitor and first diode connected in parallel circuit combination, said parallel circuit combination being connected in series between said second power supply and said third switching means, said diode being poled to conduct current from said power supply, and a third resistor having one terminal connected between said first and second switching means and the other terminal connected at the junction of said parallel circuit combination and said third switching means.

8. The circuit of claim 7 wherein the positive terminal of said second power supply is connected to the negative terminal of said first power supply and further including a second diode connected between said third switching means and said second resistor, said second diode being poled to conduct current from said second power supply, a third diode connected between said first and second switching means, said third diode being pole to conduct current from said first power supply, a second capacitor having one terminal connected at the junction of said third diode and said second switching means and the other terminal connected at the junction of said second diode and second resistor, and a third capacitor having one terminal connected at the junction of said third switching means and said second diode.

9. The circuit of claim 2 wherein said pulse circuit means comprises limiting amplifier means for providing a first pulse to switch one of said switching means on, said first pulse being produced in response to an input pulse from an external source of pulses, and delay circuit means operatively connected to said limiting amplifier means to cause said limiting amplifier means to produce a second pulse to switch one of said switching means off at a time such that each time period during which said first and second switching means are off is followed by an equal time period during which said first and second switching means are on.

10. The circuit of claim 9 wherein said limiting amplifier means comprises the series combination of a third solid state switching means and a resistor, said series combination being connected across said first power supply, said third switching means being operatively connected to at least one of said first and second switching means to switch said switching means on and off, and said delay circuit means comprises the series combination of a second resistor and a capacitor, said second resistor being operatively connected to said third switching means to permit said capacitor to charge when said third switching means is conducting current, and a transistor operatively connected to said second resistor to permit said capacitor to discharge when said transistor is conducting current and to cause said transistor to cease conducting current when said capacitor is discharged, said transistor being operatively connected to said third switching means to permit the initiation of current flow in said transistor when said third switching means is switched off and to prevent current flow in said third switching means when the current flow through said transistor is above a selected level.

11. The circuit of claim 2 wherein said pulse circuit means comprises first delay circuit means operatively connected to one of said switching means to provide a pulse to switch said switching means on at a selected interval after said switching means has been switched off, and second delay circuit means operatively connected to one of said switching means to provide a pulse to switch said switching means off at a selected interval after said switching means has been switched on.

12. The circuit of claim 11 wherein said first delay circuit means comprises a first series combination of a second resistor and a first capacitor operatively connected between said first power supply and at least one of said first and second switching means to charge said capacitor when said switching means are switched off, a third solid state switching means operatively connected to said capacitor to cause said third switching means to switch on when the voltage across said capacitor reaches the switching voltage of said third switching means, and transformer means operatively connected between said third switching means and one of said first and second switching means to produce a pulse to cause said first and second switching means to switch on when said third switching means switches on; and said second delay circuit means comprises a second series combination of a third resistor and a second capacitor, a third series combination of a fourth resistor and a third capacitor, said second and third series combinations being operatively connected between said first power supply and at least one of said first and second switching means to charge said capacitors when said first and second switching means are switched on, and fourth solid state switching means operatively connected between said second and third capacitors to cause said fourth switching means to switch on when the voltage across said second capacitor reaches the switching voltage of said fourth switching means and to cause the sum of the voltages of said second and third capacitors to be applied to said at least one of said first and second switching means to cause said switching means to switch off.

References Cited by the Examiner

UNITED STATES PATENTS

| | | | |
|---|---|---|---|
| Re. 23,769 | 1/1954 | Varian | 324—0.5 |
| 2,831,972 | 4/1958 | Foote | 328—38 |
| 2,856,579 | 10/1958 | Packard | 324—0.5 |
| 2,880,330 | 3/1959 | Linvill et al. | 307—88.5 |
| 2,944,164 | 7/1960 | Odell | 307—88.5 |
| 2,977,233 | 8/1961 | Selmer | 235—92 |
| 2,992,384 | 7/1961 | Malbain | 324—78 |
| 2,997,604 | 8/1961 | Shockley | 317—234 |
| 3,005,935 | 10/1961 | Wood | 317—148.5 |
| 3,018,392 | 1/1962 | Jones et al. | 307—88.5 |
| 3,040,195 | 6/1962 | Jones et al. | 307—88.5 |
| 3,051,851 | 8/1962 | Leonard | 307—88.5 |
| 3,065,388 | 11/1962 | Pinckaers | 317—148.5 |
| 3,087,123 | 4/1963 | Rubenstein et al. | 307—88.5 |
| 3,098,953 | 7/1963 | Herr | 317—148.5 |
| 3,119,937 | 1/1964 | Bergman | 307—88.5 |
| 3,120,653 | 2/1964 | Miller et al. | 307—88.5 |

JOHN W. HUCKERT, *Primary Examiner.*

MAYNARD R. WILBUR, ARTHUR GAUSS,

*Examiners.*

A. S. KATZ, R. SANDLER, *Assistant Examiners.*